May 19, 1970

F. M. WOOD ET AL 3,513,016

VIBRATIONAL BONDING

Filed May 5, 1967

Fenton M. Wood
Noel B. Proctor
INVENTORS

BY Arnold, Roylance
Kruger & Durkee
ATTORNEYS

United States Patent Office 3,513,016
Patented May 19, 1970

3,513,016
VIBRATIONAL BONDING
Fenton M. Wood, Sugarland, and Noel B. Proctor, Houston, Tex., assignors to American Machine & Foundry Company, New York, N.Y., a corporation of New Jersey
Filed May 5, 1967, Ser. No. 636,450
Int. Cl. B44d 1/44
U.S. Cl. 117—62           12 Claims

ABSTRACT OF THE DISCLOSURE

Bonding of a coating to a substrate, e.g., bonding a plastic coating to the surface of a pipe is effected by subjecting the substrate to a vibrational influence of kilocycle frequency in the sonic or in the ultrasonic range to create an amplitude of vibration at all points along the substrate. Since vibration of a substrate such as a pipe establishes standing waves in the pipe, there inevitably occur null points at which the pipe is not subjected to an amplitude of vibration. Vibration at all points along the substrate is accomplished by vibrating the pipe at different frequencies or by alternately affixing a stub having a length corresponding in length for example to one-quarter wavelength of the vibratory wave induced in the pipe, alternately to opposite ends of the pipe.

BACKGROUND OF THE INVENTION

The instant invention relates to a method of bonding coatings to substrates. More particularly, this invention provides a method of bonding coatings to the surface of pipes using vibrational energy.

The maintenance of the integrity of the bond between coating and substrate is a major problem in development of effective coatings. A major source of difficulty in the breakdown of coating protection arises from the breakdown of the bond between the coating and substrate in a localized area, and thereafter, the spread of corrosion in the substrate to cause further destruction of the coating-substrate bond. Since, in most cases, the effectiveness of the bond between coating and substrate is dependent upon effecting either a chemical or molecular association between the coating and the substrate, it can be readily appreciated that otherwise insignificant amounts of moisture, oil droplets, or dirt, or microscopic irregularities in the substrate surface can result in coating breakdown resulting from failure of the bond between the coating and the substrate.

Often, where paint or lacquer or other organic coatings are applied to a substrate, the coating affords adequate protection despite such minor defects. However, if the coating is designed to afford chemical or electrolytic protection to the substrate in an extremely corrosive or otherwise damaging environment, such minor breakdown of the coating can lead to initiation of substrate corrosion which can quickly spread to cause widespread damage. For example, coated pipe employed in well boreholes or as underground conduit for chemicals or gases must be checked for the smallest pinhole in its organic protective coating, since the corrosive potentially resultant from even a microscopic discontinuity in the coating is great. Particularly, in the instances of underground pipe, if a pinhole is found, it may become necessary to suspend the function of the pipe while repairs are made and thus it is extremely desirable to effect the initial coating procedure to produce as uniform a bond as is possible.

The technique of vibrating a substrate has been employed at times during the application of coatings, although in most instances the vibrational influence was induced only as a side effect of an induction heating process wherein plastic or the like was fused to the substrate. It has been found that application of vibrational energy alone, even without accompanying heat, to a substrate can be effective in the bonding procedure. It is postulated that the vibration, preferably at a kilocycle frequency, serves to produce a scrubbing action between the coating and the substrate which at once enables the substrate to overcome the minor effects of surface tension and the like and fill the molecular interstices in the substrate, and also disperses any slight amount of moisture or dirt which might exist on the substrate surface into the coating thus enabling direct contact between the coating and the substrate, a prerequisite to a good bond.

However, the vibrational influence sets up standing waves in a pipe or similar longitudinal member thus resulting in substantially no amplitude of vibration at those points corresponding to the 180° and 360° crossing points of the vibratory wave. At those points corresponding to the nodes of the vibrational wave, the scrubbing action between coating and substrate has not been effectively carried out thus leaving areas for potential bond failure. In applications where even pinholes in the coating must be avoided, the vibratory methods of the art such as they were employed did not provide sufficient uniform bond integrity.

SUMMARY OF THE INVENTION

It has been found in accordance with the instant invention that application of vibrational energy, without concurrent heating of the substrate, can provide an excellent bonding procedure if the substrate is vibrated to impart amplitude of vibration at all points along the substrate.

There is accordingly provided by the instant invention a novel method for forming continuous protective coatings on the surface of substrates, and particularly for producing a superior coating bond on the interior or exterior surface of pipes, under conditions ordinarily disruptive of coating integrity, which comprises inducing in the pipe substrate a vibrational wave having a kilocycle frequency in the upper sonic or ultrasonic range, e.g., about 5 to 40 kilocycles, and shifting the pattern of the wave to produce an amplitude of vibration at all points along the pipe substrate.

Vibration at all points along a substrate is accomplished by shifting the position of the antinulls of vibrational influence wave such that the antinulls of a subsequent vibrational wave affect substantially the same points of the substrate as were null during a first vibrational wave. This may be accomplished by shifting the frequency and wavelength of the subsequent vibrational influence from the first. Shifting of the position of the antinulls along a pipe can also be most effectively accomplished in accordance with the preferred method of invention which involves alternately affixing a stub of predetermined length to opposite ends of the pipe.

This latter method is preferred since it completely shifts vibratory nulls from any given spot or point. Shift of frequency, though it does greatly decrease the number of nulls, does not eliminate nulls completely and hence is less preferred. Other methods of shifting the antinulls will also be discussed below as part of the instant invention.

BRIEF DESCRIPTION OF THE DRAWINGS

The instant invention will be more particularly understood with reference to that specific embodiment of the invention illustrated in the accompanying drawings.

DESCRIPTION OF THE PREFERRED EMBODIMENTS

Figure 1:
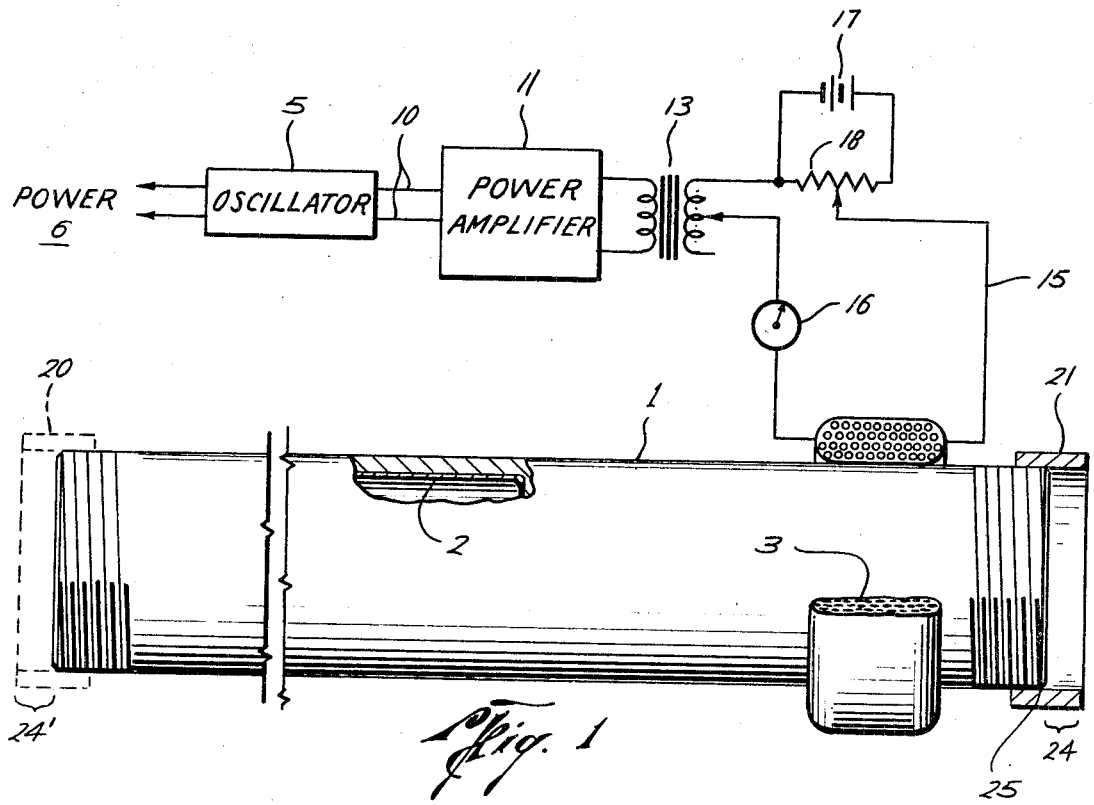
FIG. 1 is a schematic representation of the apparatus and electrical circuitry which may be employed to conduct the novel method of the instant invention.

Referring now to FIG. 1, there is shown in schematic functional illustration, a pipe 1 having an adherent coating 2 applied to the interior thereof. Coating 2 may be of any one of the numerous and various organic resinous materials, for example, the alkyd resin paints or lacquers, the hydrocarbon polymers such as polyethylene, polypropylene, or polystyrene, or another organic polymer such as a polyester or a polyamide. Most often, in the case of the latter polymeric coatings, the polymer is dissolved or preferably dispersed in a suitable volatile liquid vehicle which, upon evaporation, leaves a smooth continuous film of the polymer on a surface. These fluidized coatings, i.e., coatings suspended or dissolved in a volatile vehicle to facilitate application, may be applied by any suitable method such as spraying, rolling, brushing, dipping, or the like.

As stated above, it is postulated that the superior coating bonds produced by the novel method of this invention result from a scrubbing action between the coating and the substrate which serves to bring the coating into intimate contact with interstices in the substrate and which also serves to disperse casual foreign matter on the substrate into the coating. This also improves the coating substrate contact and hence improves the bond.

However, it is pointed out that the instant invention may have reference to coatings applied to the substrate in sheet form using pressure and for example heat or an adhesive. For example, the application of polymeric organic films to pipe may be effected by pressing a film or sheet of thermoplastic or thermosetting organic polymer against the substrate surface with a heated mandrel or the like, either to directly bond the sheet to the substrate surface or with a heat activatable or like adhesive between the sheet and substrate. In such instances, it is potulated that the scrubbing effect of the vibrational energy applied to the substrate in accordance with the novel method of this invention has the effect of fluidizing the adhesive molecular layer of the sheet adjacent to the substrate to thus accomplish improved adhesion.

Although FIG. 1 illustrates the coating 2 on the interior of the pipe 1, it will be readily appreciated that the instant invention is equally adaptable to the bonding of coating to the outer pipe wall or to substrate surfaces of different configuration.

The novel process of this invention involves vibrating the substrate at kilocycle frequency in the sonic or ultrasonic range following application of the coating. Although the novel method of this invention would include application of vibrational energy during coating application, the vibrational influence as discussed herein is most often imposed after coating application.

In FIG. 1. exciting coil 3 shown in partial section encircling pipe 1 at its right end, is disposed in such a manner as to impose a vibrational influence upon the pipe when suitably energized. Energization of the coil induces vibration in pipe 1 by the magnetostrictive effect. Although other methods of inducing vibrational influence may be used, the magnetostrictive methods are preferred. The coil imposes a wave which travels longitudinally down the pipe. A shown in FIG. 1, an oscillator 5 is connected to a power source 6, and in turn is connected through leads 10 to any suitable power amplifier 11. From the amplifier 11, energy is fed to a transformer 13 which preferably matches the impedance of the exciting coil 3. If this impedance varies with different specimens, said transformer 13 should be of a variable type, as schematically illustrated. Energy from the transformer 13 is fed through lines 15 to the coil 3. An alternating current ampere meter 16 is suitably interposed in the line to enable reading of current.

Direct current source 17 may be employed to bias the oscillatory signal to the exciting coil 3 and cause the magnetostrictive effect of coil 3 to impart greater amplitude of vibration. Direct current source 17 serves, for example, to bias the entire pulsating circuit and the coil 3 above ground such that the alternating current imposed on the pulsating circuit alternately adds to and subtracts from the DC voltage at which the circuit is biased. Without the DC bias, for example, 10 kilocycles alternating current, the coil would induce a magnetostrictive influence at each positive and negative voltage peak of each cycle, the alternating current to the coil producing a 20 kilocycle vibration in the substrate. But if the pulsating circuit is biased up by DC source 17, one cycle of the alternating current provides only additive and subtractive effects on the positive voltage supplied to the coil to produce a unipolar cyclical signal. Accordingly, the DC biased coil induces in the pipe a 10 kilocycle vibrational influence having a frequency corresponding to the AC frequency, and having twice the amplitude of that produced by the nonbiased AC source alone.

Variable attenuating resistance 18 enables biasing the pulsating circuit by any amount desired.

As stated above, the novel method of this invention is carried out by shifting a standing vibrational wave in the pipe substrate to produce an amplitude of vibration at all points along the substrate.

Initially, this may be accomplished by affixing vibrational stubs such as at 20 and 21 to alternate ends of the pipe substrate. A standing vibrational wave induced in a longitudinal member of finite length, such as a pipe inevitably produces full amplitude vibration or antinulls at each end of the pipe. The existence of antinulls at the ends of the pipe fix the position of the nulls and the antinulls all along the pipe length, and accordingly, the position of the nulls and antinulls along the pipe can be effectively shifted by attaching a stub of predetermined length alternately to the two ends of the pipe.

Figure 2:
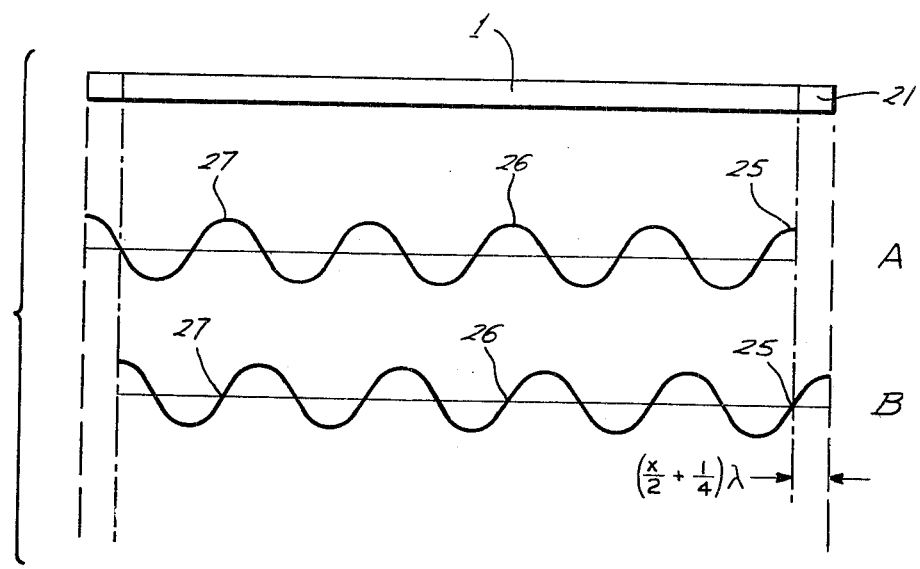
FIG. 2 is a drawing showing schematically a vibrational wave, and how the subsequent imposition of a second wave 90° out of phase results in effective vibration of all points along the surface.

Referring now once again to FIG. 1, the use of a vibrational stub 21 to shift the position of nulls and antinulls along a substrate is illustrated. Stub 21 is shown in solid outline on the right-hand side of pipe 1 and is threaded so as to be adapted to be screwed onto pipe 1. Stub 21 is affixed to the pipe to extend beyond the end of pipe 1 by an amount 24 equal to, for example, one-fourth of the wavelength of the vibrational wave to which the pipe will be subjected in the bonding process. After affixing the stub on the pipe as shown at 21, the stub will vibrate with the pipe and produce an antinull at the end of the stub 21 as schematically illustrated in wave form B in FIG. 2. When the end of the stub 21 is vibrating as an antinull, the end of pipe 1 at 25 will be a null point. Likewise, null points are established at points schematically shown at 26 and 27 along the pipe substrate 1. If then stub 21 is removed to position 20 shown at the left-hand side of pipe 1 in dotted outline and is adapted to extend beyond the pipe by a similar distance 24' corresponding again to, for example, one-fourth wavelength, the wave form A of FIG. 2 will be produced along the substrate upon a second vibrational influence at the same frequency as the former vibrational influence. It will be noted that this second vibrational influence creates antinulls at positions 25, 26, and 27 which were null points while the first vibrational influence occurred. Thus, the positioning of stub 21 at the opposite ends of pipe 1 while subjecting the pipe sequentially to the same vibrational influence effectively produces a significant amplitude of vibration all along the substrate thus firmly bonding coating 2 to pipe 1.

The effective length of stub 21 in the above process is not its overall length but rather the length by which it is made of "overhang" or extend beyond the pipe 1 during each induced vibration of the pipe. Accordingly, a stop or the like can be provided on stub 21 such that the stub can be screwed onto pipe 1 tightly against the stop to provide precisely the proper overhang of the stub without need for repetitive measurement. Of course, stub 21 need not be screwed onto pipe 1 as shown but may be affixed in any manner so that the stub vibrates with the pipe. Thus, stub 21 may be clamped to pipe 1 or the like.

It will be appreciated that the overhang or extension of stub 21 beyond pipe 1 may be one-fourth of the wavelength (λ/4) of the vibrational influence or may be equal to any number of whole wavelengths plus a fraction (other than one-half) a wavelength. Any fractional amount of a wavelength of the overhang 24 will produce a phase shift as stub 21 is moved from one end of pipe 1 to the other. If the overhang is one-fourth of the wavelength or a whole number of wavelengths plus one-fourth wavelength (or a whole number of wavelengths plus three-fourths wavelength) the antinulls produced by the second vibration shall be positioned at precisely the null points of the first vibration and hence this arrangement is preferred. Thus the amount of extension 24 provided by the stub may be expressed in this preferred embodiment $$\text{Extension} = \left(\frac{X}{2} + \frac{1}{4}\right)\lambda$$

where X is a whole number variable having a range of 0 to infinity and wherein λ is wavelength. Of course, it is understood that it is desired in accordance with this invention to attempt to produce an extension of this amount. The process is still effective even if the overhang is not exactly equal to the above function since, as stated above, any fractional wavelength overhang or whole number of wavelengths plus a fraction (other than ½) produces some shift of the second vibratory wave from the first and hence effects an elimination of nulls. To state the amount of extension in another manner, it may be stated that the extension should be such that when the stub is affixed to one end of the pipe and is vibrating as an antinull, the actual end of the pipe 25 to which the stub is affixed should be vibrating at less than the amplitude of an antinull and preferably the end of the pipe should be a null point. Thus, when the stub is affixed to the opposite end of the pipe with the same amount of extension, the second vibratory wave with the stub in this position would be effectively 90° out-of-phase with the former vibratory wave.

Alternately, the null points in the initial vibratory influence can be eliminated by another technique in accordance with the novel method of this invention. The frequency of the vibrational influence induced in the pipe may be changed thus effectively shifting the points at which antinulls and nulls occur. However, if a substrate is simply sequentially vibrated at two different frequencies a number of null points will nonetheless remain. Accordingly, if frequency variation is to be employed, it is preferred to slowly change the frequency of the vibrational influence while continuing to apply the vibrational influence to the pipe substrate. This effects a gradual shifting of the antinulls over the substrate surface to effectively eliminate all null points. All points on a substrate will be subjected to sufficient and effective vibration if subjected to a varying frequency vibrational influence such that the highest frequency of the range over which vibration is applied is at least 50 percent greater than lowest frequency in the range. Of course, in employing the varying frequency technique, the frequency may be increased or decreased, e.g., frequency may be increased from 10 to 15 kilocycles or decreased from 15 to 10 kilocycles to obtain complete vibration of the substrate over the indicated range of at least 50 percent variance of frequency.

Conveniently, a sweep generator or a like apparatus may be employed which can sweep the desired range of frequencies desired to be applied to the substrate. Since sweep generator apparatus may be set to make a sweep in a preset time period, the same vibrational treatment to each pipe substrate can be assured. If desired, the sweep generator can be made to sweep the frequency range desired several times to assure elimination of null points.

As indicated above, the vibrational influence on the pipe preferably has a frequency in the sonic range extending into the ultrasonic range.

Although the precise range to be employed will vary both with the nature and composition of the substrate and the coating, a vibrational influence having a frequency in the range of 5 to 40 kilocycles per second is preferred.

Pulsating coil 3 may be of any suitable type as is well known in the art for producing a magnetostrictive effect to impose the kilocycle frequency vibrations in the pipe 1. In general, it is sufficient in the method of this invention to apply the vibrational energy to the pipe for a short time, generally not sufficient to produce significant heating of the substrate, e.g., not more than thirty seconds. Typically, when a stub is affixed at the two ends of the pipe, it is sufficient to vibrate the pipe for a period of about ten second to fifteen seconds with the stub in each position to affect the improved adhesion in accordance with this invention.

What is claimed is:
1. A method for applying a coating material to a surface of a pipe during which a scrubbing action is established between the entire surface to be coated and the applied coating material to produce a continuous bond between the pipe surface and the coating material, said method comprising
    applying an adherent coating material to the surface of the pipe,
    establishing physical vibrational waves in the pipe having the coating material applied thereto to set up standing vibrational waves throughout the length of said pipe, whereby nulls and antinulls exist alternately at regularly spaced points along said pipe,
    shifting the positions of said null and antinull points of the vibrational standing waves in said pipe by a distance approximately equal to an odd multiple, including one, of a quarter wavelength of said standing waves so that all points along the length of the pipe are subject to the vibrational influence of an antinull and the scrubbing action between the pipe surface and coating material occurs at all points along the length of the coated pipe.
2. The method of claim 1 wherein the frequency at which said pipe is vibrated is varied continuously during vibration of the pipe to shift the position of null and antinull points.
3. The method of claim 2 wherein the frequency at which said pipe is vibrated is varied between two frequencies the higher of which is at least 50 percent higher than the lower frequency.
4. The method of claim 2 wherein said coating is in sheet form and is applied to said pipe by means of pressure.
5. The method of claim 1 wherein the said pipe is vibrated by means of an exciting coil encircling the pipe to induce a magnesteostrictive vibration in said pipe.
6. The method of claim 1 wherein said pipe is vibrated at a frequency of from about five to about forty kilocycles per second.
7. The method of claim 1 wherein said pipe is vibrated for a short period of time not sufficient to produce significant heating of the said pipe.
8. The method of claim 1 wherein said coating is a fluidized coating capable of forming a continuous covering on said pipe upon evaporation of a volatile vehicle.
9. A method for applying a coating material to a surface of a pipe during which a scrubbing action is established between the entire surface to be coated and the applied coating material to provide a continuous bond between the pipe surface and the coating material, said method comprising, applying an adherent coating material to the surface of the pipe, sequentially vibrating said pipe at a given frequency in the kilocycle range with a stub alternately affixed to opposite ends of the pipe, thereby to set up standing vibrational waves throughout the length of the pipe, said stub extending beyond the respective ends of said pipe by an amount corresponding to a fractional portion of a wavelength of said standing waves to produce less than full antinull vibration at the point corresponding to the end of the pipe on which the stub is affixed.

10. The method of claim 9 wherein said stub is alternately affixed to opposite ends of said pipe to provide an extension beyond the ends of the pipe corresponding to approximately $$\left(\frac{X}{2}+\frac{1}{4}\right)\lambda$$

wherein X is a whole number including 0 and wherein $\lambda$ is the wavelength of vibrational influence induced in the pipe.

11. The method of claim 9 wherein said pipe is vibrated by:

encircling said pipe with an exciting coil capable of producing a magnetostrictive effect on said pipe, generating an alternating current signal having a frequency of from about 5 to about 40 kilocycles, biasing said alternating current signal to produce a biased unipolar cyclical signal at said alternating current frequency, and exciting said coil with said unipolar cyclical signal to produce magnetostrictive vibration of said pipe.

12. A method for forming a continuous protective coating on a pipe carrying casual foreign matter disruptive of coating integrity which comprises:

applying an adherent coating to the surface of said pipe, affixing to a first end of said pipe a vibrational stub for vibrating with the pipe, said stub extending beyond the end of said pipe by a distance of approximately $$\left(\frac{X}{2}+\frac{1}{4}\right)\lambda$$

wherein X is a whole number including 0 and wherein $\lambda$ is the wavelength of a vibrational wave to be imposed on said pipe, magnetostrictively vibrating said pipe at a frequency of from about 5 to about 40 kilocycles to produce in the pipe a vibrational wave of wavelength $\lambda$, affixing said stubs to the second end of said pipe to provide a similar extension beyond said second end, and magnetostrictively vibrating said pipe again at said frequency.

References Cited
UNITED STATES PATENTS

| | | |
|---|---|---|
| 2,522,082 | 9/1950 | Arnold. |
| 3,198,170 | 8/1965 | Onishi. |

ALFRED L. LEAVITT, Primary Examiner

C. R. WILSON, Assistant Examiner

U.S. Cl. X.R.

117—94, 95